US012269190B2

(12) United States Patent
Lin

(10) Patent No.: US 12,269,190 B2
(45) Date of Patent: Apr. 8, 2025

(54) WORKTABLE FOR TILE CUTTER WITH WATER DRAINAGE ASSEMBLY

(71) Applicant: REXON INDUSTRIAL CORP., LTD., Taichung (TW)

(72) Inventor: Yue-Yi Lin, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 340 days.

(21) Appl. No.: 17/735,672

(22) Filed: May 3, 2022

(65) Prior Publication Data
US 2022/0347886 A1 Nov. 3, 2022

(30) Foreign Application Priority Data

May 3, 2021 (TW) .................................. 110115937

(51) Int. Cl.
*B28D 7/04* (2006.01)
*B23Q 1/01* (2006.01)
(Continued)

(52) U.S. Cl.
CPC ............... *B28D 7/04* (2013.01); *B23Q 1/015* (2013.01); *B23Q 1/262* (2013.01); *B28D 1/22* (2013.01)

(58) Field of Classification Search
CPC .......................... B23Q 1/262; B23Q 11/0042; B23Q 11/0053; B23Q 11/0067; B23Q 11/0858;
(Continued)

(56) References Cited

U.S. PATENT DOCUMENTS

| 4,197,678 A * | 4/1980 | Roll | B24B 55/02 29/DIG. 87 |
| 7,406,962 B1 * | 8/2008 | Chen | B28D 7/04 125/35 |

(Continued)

FOREIGN PATENT DOCUMENTS

| CN | 107932746 A * | 4/2018 | ............. B28D 1/047 |
| CN | 107972187 A * | 5/2018 | |

(Continued)

OTHER PUBLICATIONS

Translation of CN 107932746 A (Year: 2018).*
Translation of CN 109225892 A (Year: 2019).*

*Primary Examiner* — David S Posigian
*Assistant Examiner* — Steven Huang
(74) *Attorney, Agent, or Firm* — BACON & THOMAS, PLLC

(57) ABSTRACT

A worktable for tile cutter with water drainage assembly includes a movable platform and a pivotable guiding member. The movable platform has a drainage channel defined therein. The guiding member has a diversion channel defined therein and communicated with the drainage channel. The guiding member has a first diversion opening and a second diversion opening respectively located on two ends thereof. When the movable platform is in a first position, the first diversion opening is inclined downwards such that the diversion channel guides the water from the drainage channel through the first diversion opening to a water collection tank located under the movable platform. When the movable platform is in a second position, the second diversion opening is inclined downwards such that the diversion channel guides the water from the drainage channel to the water collection tank. Therefore, the draining worktable can provide a good drainage effect.

5 Claims, 12 Drawing Sheets

(51) Int. Cl.
*B23Q 1/26* (2006.01)
*B28D 1/22* (2006.01)

(58) Field of Classification Search
CPC ........ B23Q 11/1069; B28D 7/02; B28D 7/04;
B28D 7/025; B28D 1/047; B23D 59/02;
B23D 59/04; B26D 7/088
USPC .......................................... 125/13.01, 14, 35
See application file for complete search history.

(56) References Cited

U.S. PATENT DOCUMENTS

| | | | | |
|---|---|---|---|---|
| 8,215,296 | B1 * | 7/2012 | Cisneros | B28D 7/04 125/13.03 |
| 2002/0037692 | A1 * | 3/2002 | Bajo | B23Q 11/1069 451/361 |
| 2003/0051720 | A1 * | 3/2003 | Bradfield | B27B 27/02 125/13.01 |
| 2004/0149107 | A1 * | 8/2004 | Lee | A47L 9/102 83/581 |
| 2008/0289467 | A1 * | 11/2008 | Skillings | B23D 45/068 83/477.1 |
| 2011/0232620 | A1 * | 9/2011 | Cao | B28D 7/02 125/13.01 |
| 2012/0118278 | A1 * | 5/2012 | La Banco | B23D 59/02 125/35 |
| 2017/0173824 | A1 * | 6/2017 | Sergyeyenko | B28D 1/047 |
| 2021/0060672 | A1 * | 3/2021 | Lee | B23D 47/025 |

FOREIGN PATENT DOCUMENTS

| | | | | |
|---|---|---|---|---|
| CN | 109225892 A | * | 1/2019 | ............. B07B 13/08 |
| GB | 2333480 A | * | 7/1999 | ............. B27B 27/02 |

* cited by examiner

WORKTABLE FOR TILE CUTTER WITH WATER DRAINAGE ASSEMBLY

BACKGROUND OF THE INVENTION

1. Technical Field

The present invention is related to a tile cutter, and in particular, to a worktable for a tile cutter with a water drainage assembly.

2. Description of Related Art

Since tiles are materials with crisp and hard characteristics, during tile cutting, conventional cutting tools cannot be used, and tile cutters designed exclusively for tile cutting must be used to perform cutting. During the cutting process, water is often sprayed onto tiles timely, and the purpose of the water spray is to cool the temperature of the saw and to wet the dust and powder to prevent arbitrary scattering of dust and powder in the air, thereby protecting operators from inhaling excessive dust and powder that may cause discomfort and pose a health hazard.

Nevertheless, during the tile cutting process, some of the water sprayed onto the tile tends to remain on the worktable, such that operator's clothes can be wetted, and since such water typically contains dust and powder, the worktable also tends to be contaminated by such water.

BRIEF SUMMARY OF THE INVENTION

The primary objective of the present invention is to provide a worktable for a tile cutter with a water drainage assembly, capable of achieving excellent water drainage effect.

To achieve the aforementioned primary objective, the present invention provides a worktable for a tile cutter with a water drainage assembly, and the tile cutter comprises a base and a water collection tank arranged on the base. The worktable with a water drainage assembly of the present invention comprises a movable platform and a guiding member. The movable platform is located on top of the water collection tank and movably arranged on the base to move between a first position and a second position, and the movable platform includes a drainage channel penetrating through two top and bottom surfaces thereof. The guiding member is pivotally attached to the bottom surface of the movable platform and configured to swing upward and downward between a first state and a second state relative to the movable platform. The guiding member includes a diversion channel communicated with the drainage channel, one end of the guiding member includes a first diversion opening communicated with the diversion channel, and another end of the guiding member includes a second diversion opening communicated with the diversion channel, such that when the movable platform is at the first position, the guiding member is inclined downward toward a direction of the first diversion opening to be in a first state, and the first diversion opening is located on top of the water collection tank, and a vertical distance between the first diversion opening and the movable platform is greater than a vertical distance between the second diversion opening and the movable platform, allowing the diversion channel to guide the water flowing from the drainage channel into the water collection tank via the first diversion opening; when the movable platform is at the second position, the guiding member is inclined downward toward a direction of the second diversion opening to be in a second state, and the second diversion opening is located on top of the water collection tank, and a vertical distance between the second diversion opening and the movable platform is greater than a vertical distance between the first diversion opening and the movable platform, allowing the diversion channel to guide the water flowing from the drainage channel into the water collection tank via the second diversion opening.

According to the above, it can be understood that the worktable with a water drainage assembly of the present invention is able to utilize the upward and downward swing of the guiding member in order to allow the guiding member to properly guide the water sprayed onto the movable platform to the water collection tank regardless whether the movable platform moves forward or rearward, thereby reducing water accumulation on the movable platform, and preventing the situation of the movable platform and operator being wetted and contaminated due to the water accumulation.

Preferably, the two front and rear sides of the base include a first guiding piece and a second guiding piece secured thereto respectively. The first guiding piece and the second guiding piece are located at two left and right opposite sides of the guiding member. The guiding member includes a first end and a second end, the first end having the first diversion opening, and the second end having the second diversion opening; a side surface of the guiding member having a first inclined slot, the first inclined slot extending from the second end of the guiding member toward the first end of the guiding member and inclined upward; another opposite side surface of the guiding member having a second inclined slot, the second inclined slot extending from the first end of the guiding member toward the second end of the guiding member and inclined upward. Accordingly, when the first guiding piece is inserted into the first inclined slot, the guiding member is pushed by the first guiding piece to pivotally rotate to the first state, and at this time, the second guiding piece disengages from the second inclined slot. When the second guiding piece is inserted into the second inclined slot, the guiding member is pushed by the second guiding piece to pivotally rotate to the second state, and at this time, the first guiding piece disengages from the first inclined slot.

Preferably, the first guiding piece includes a first support plate secured to the base and a first insertion pin arranged on the first support plate. The first guiding piece uses the first insertion pin for inserting into the first inclined slot. Preferably, the second guiding piece includes a second support plate secured to the base and a second insertion pin arranged on the second support plate. The second guiding piece uses the second insertion pin for inserting into the second inclined slot.

Preferably, the second end of the guiding member includes a first conical opening communicated with the first inclined slot, and a width of the first conical opening increases along a direction away from the first inclined slot, thereby allowing the first guiding piece to engage with and disengage from the first inclined slot successfully. The first end of the guiding member includes a second conical opening communicated with the second inclined slot, and a width of the second conical opening increases along a direction away from the second inclined slot, thereby allowing the second guiding piece to engage with and disengage from the second inclined slot successfully.

Preferably, the movable platform includes a first seat and a second seat. A top surface of the first seat includes a first channel, and the first seat includes a drainage opening communicated with the diversion channel; the second seat is detachably arranged on the top surface of the first seat and includes a second channel formed with the first seat, one end of the second channel communicated with the first channel, and another end of the second channel communicated with the drainage opening, such that the first channel, the second channel and the drainage opening jointly form the drainage channel. Accordingly, the water sprayed onto the movable platform flows to the second channel from the first channel, and then flows to the diversion channel of the guiding member from the second channel via the drainage opening.

Preferably, the two left and right sides of the base include a first blocking piece and a second blocking piece respectively arranged at the front and rear one after another. The bottom surface of the movable platform includes a blocking portion and a second blocking portion, such that the movable platform stops movement and is positioned at the first position when the first blocking portion of the movable platform contacts with the first blocking piece, and the movable platform stops movement and is positioned at the second position when the second blocking portion of the movable platform contacts with the second blocking piece.

The detailed structure, features, assembly or method of use of the worktable for tile cutter with a water drainage assembly of the present invention are further described in the following embodiments of the present invention. Nevertheless, a person with ordinary skilled in the art in the technical field of the present invention shall understand that the detailed description and specified embodiments of the present invention are provided to illustrate the present invention only such that they shall not be used to limit the scope of the claims of the present invention.

DETAILED DESCRIPTION OF THE INVENTION

Figure 1:
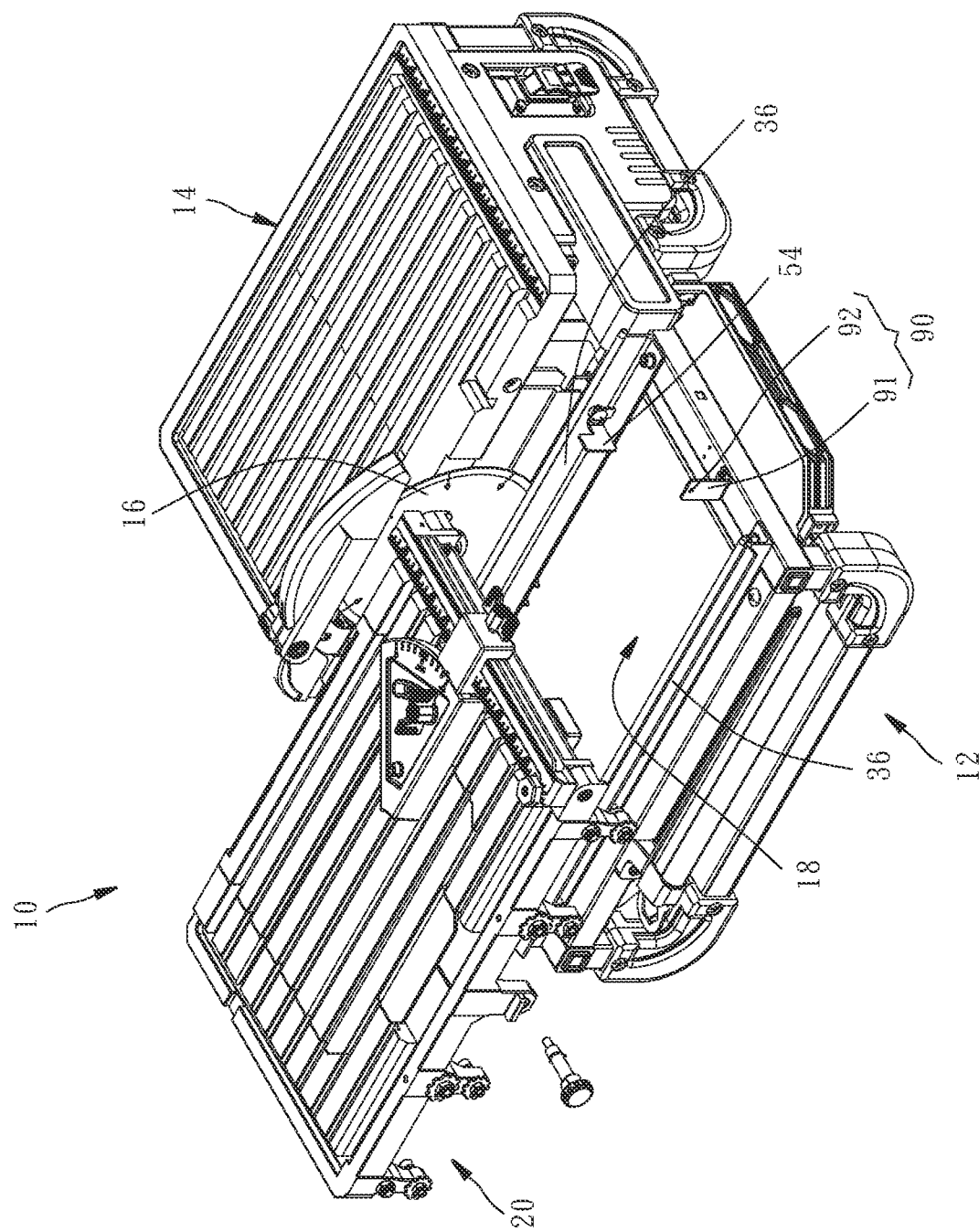
FIG. 1 is a perspective view of the worktable for a tile cutter with a water drainage assembly of the present invention.

The applicant emphasizes that for the content of this specification, including the embodiments and the claims described in the following, relevant directional terms shall refer to the directions shown in the drawings in principle. In addition, for the embodiments and drawings described in the following, identical component signs refer to identical or similar components or structural features.

Please refer to FIG. 1. As shown in FIG. 1, a tile cutter 10 comprises a base 12, a securement platform 14, a saw blade 16 and a water collection tank 18. The securement platform 14 is secured to the top of the base 12 and is located at the right side of the base 12, and it is used for the placement of a tile (not shown in the drawings) for cutting. The saw blade 16 is arranged at the center of the base 12 and is driven by a power source (such as motor, not shown in the drawings) to rotate. The water collection tank 18 is arranged inside the base 12 and is located at the left side of the base 12. Since the tile cutter 10 is not the main scope of the present invention, its detailed structure and operation process are omitted here.

Figure 2:
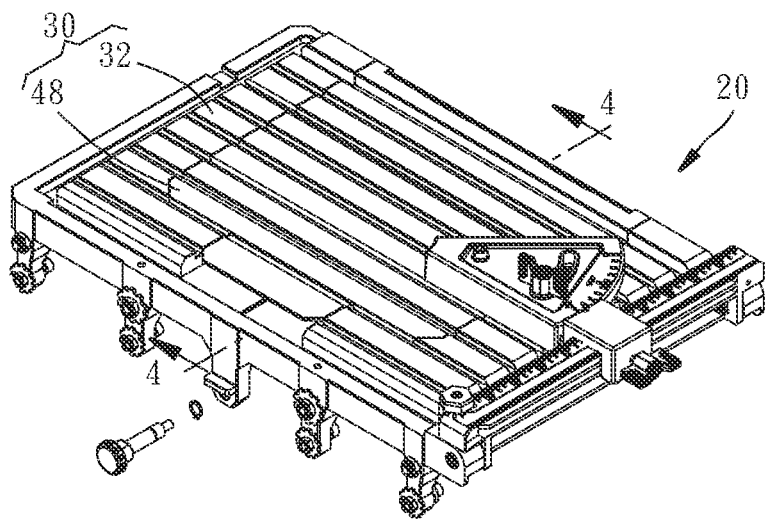
FIG. 2 is a partial perspective exploded view of FIG. 1.
Figure 2:
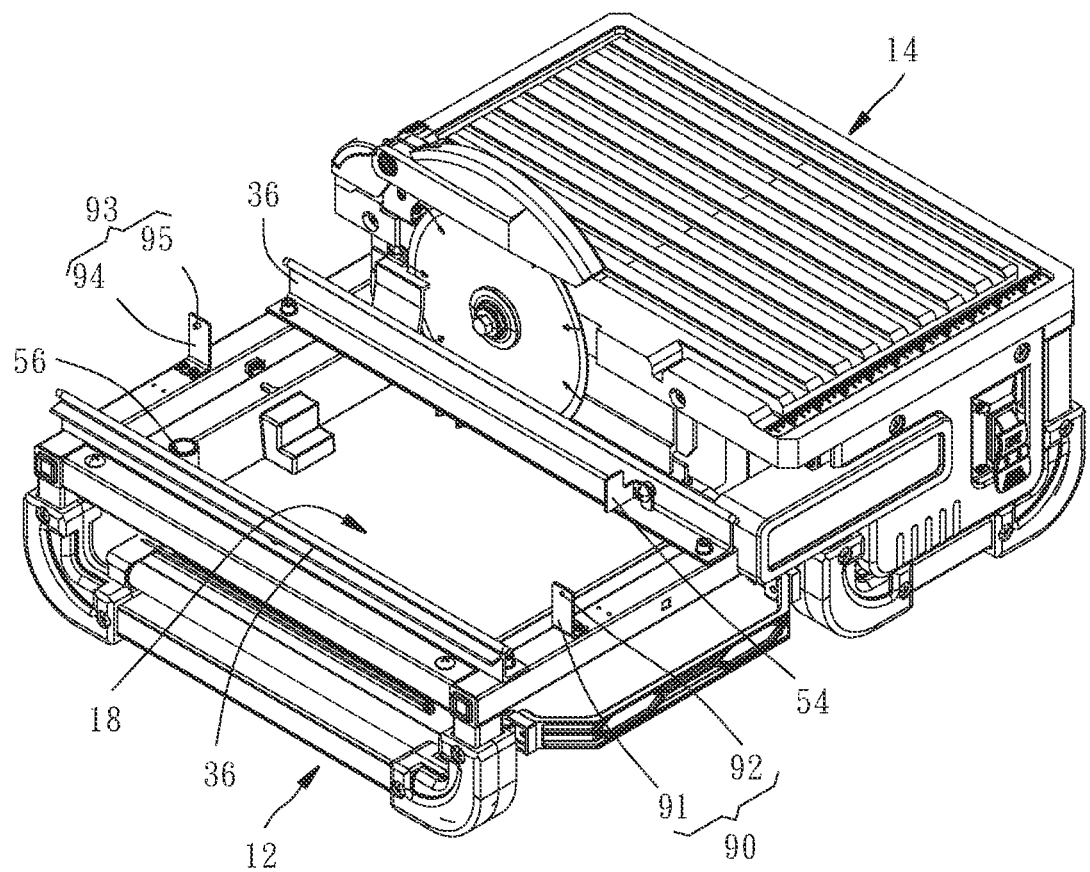
Figure 3:
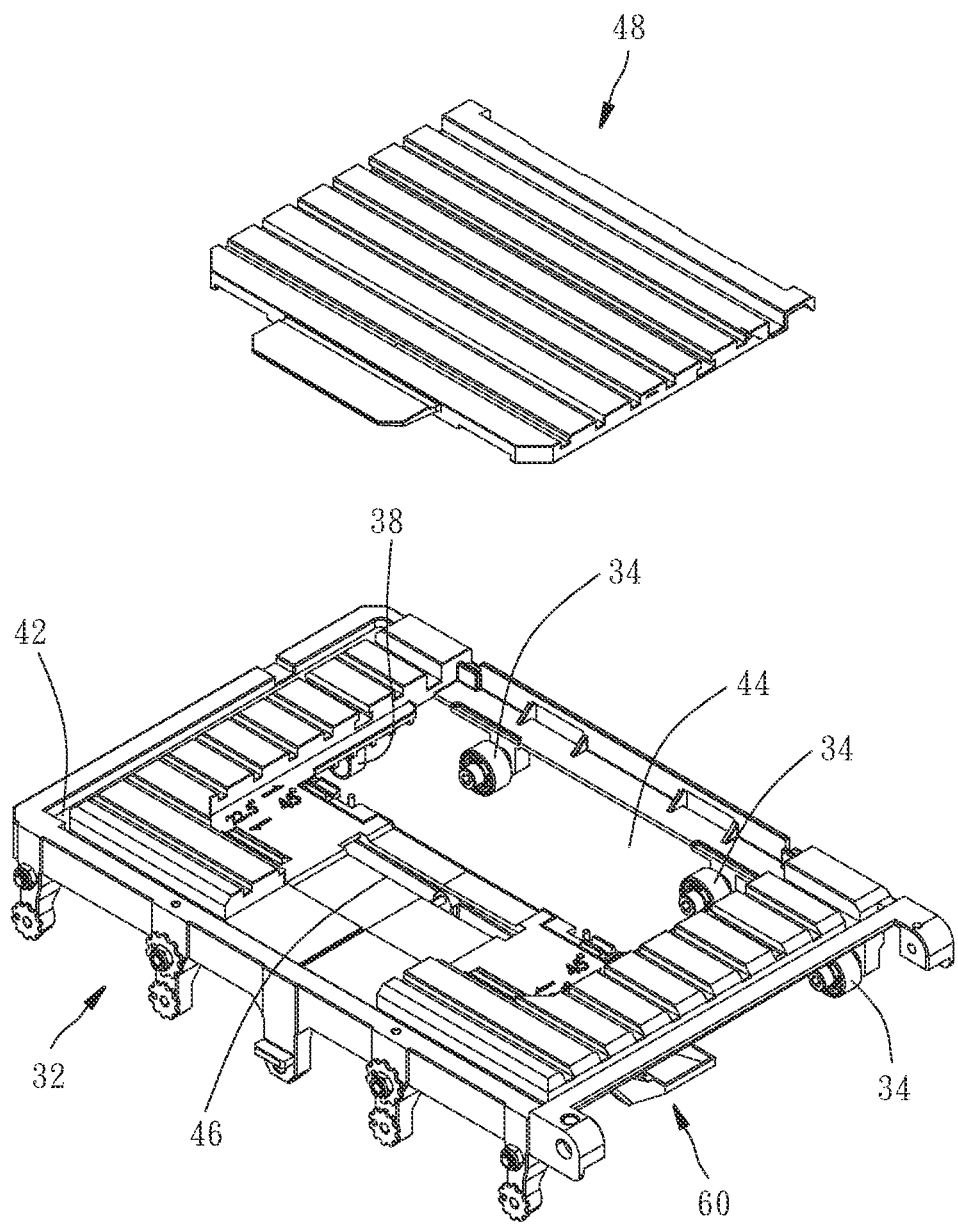
FIG. 3 is a partial perspective exploded view of the worktable for a tile cutter with a water drainage assembly of the present invention.

Please continue to refer to FIG. 1 to FIG. 3. The worktable 20 with a water drainage assembly comprises a movable platform 30, a guiding member 60, a first guiding piece 90 and a second guiding piece 93.

The movable platform 30 is located at the left side of the base 12 and on top of the water collection tank 18, and cooperates with the securement platform 14 to allow a tile (not shown in the drawing) for cutting to be placed thereon, such that a saw blade 16 can be used to perform cutting on the tile. As shown in FIG. 3, the movable platform 30 includes a first seat 32. The two left and right sides of the bottom surface of the first seat 32 respectively include a plurality of rollers 34 (four rollers in this embodiment; however, the present invention is not limited to such number only). The top surface of the base 12 includes two tracks 36 arranged parallel to each other. The first seat 32 utilizes the plurality of rollers 34 installed at the two tracks 36 of the base 12, in order to allow the first seat 32 to move forward and backward relative to the base 12.

Figure 5:
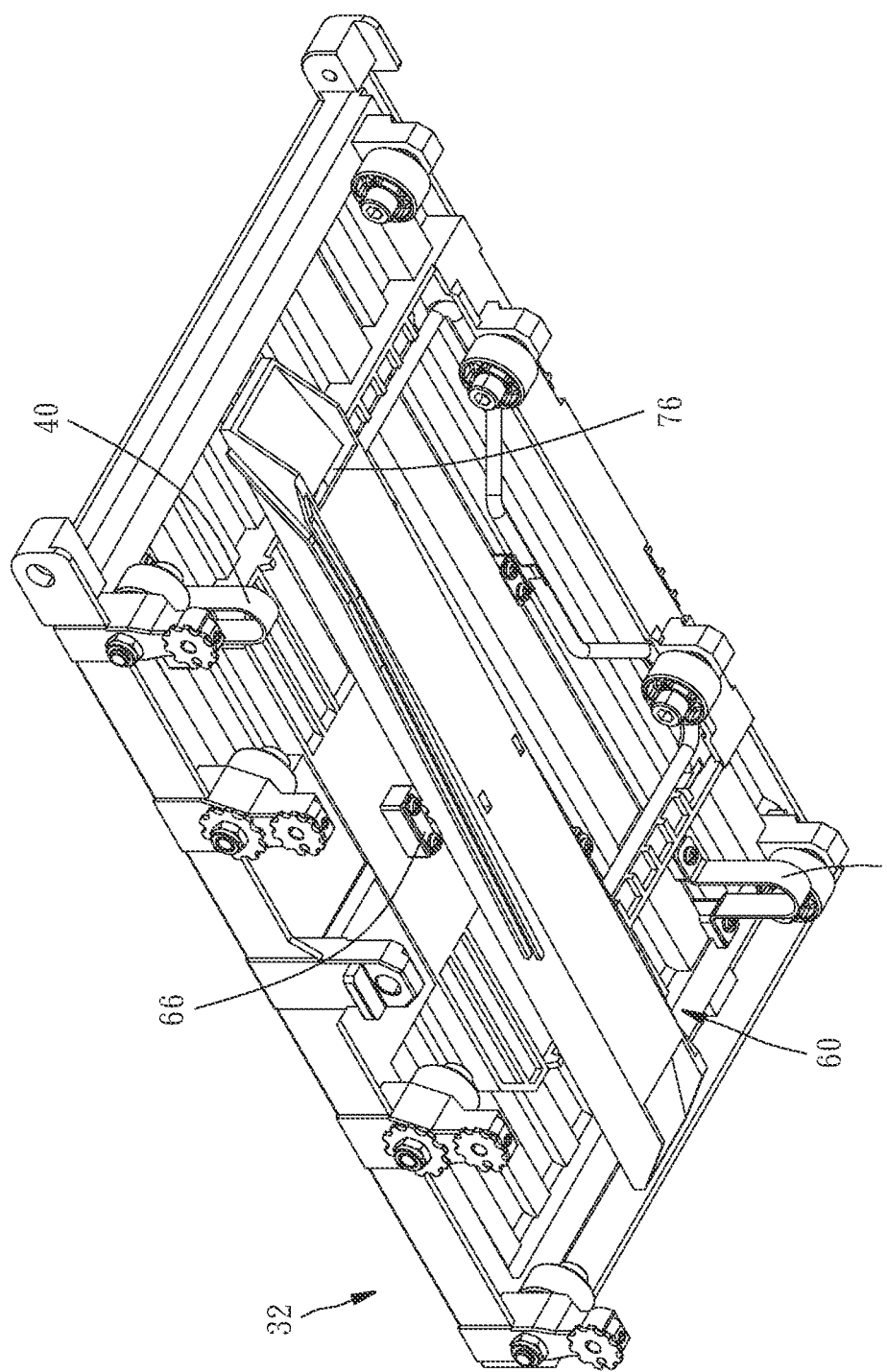
FIG. 5 is a bottom perspective view of the worktable for a tile cutter with a water drainage assembly of the present invention.
Figure 11:
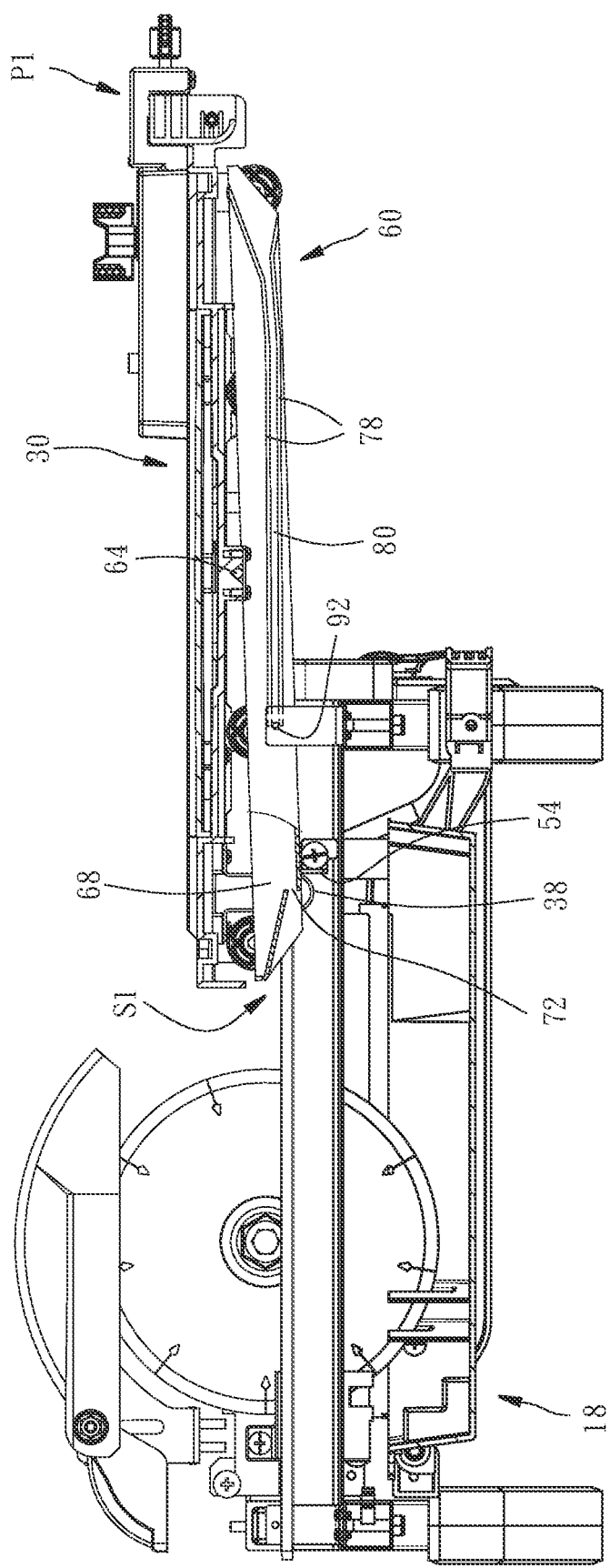
FIG. 11 is partial cross sectional view of the worktable for a tile cutter, from a first side, with a water drainage assembly of the present invention, mainly showing the movable platform at the first position and the guiding member in the first state.

To restrict the movement range of the first seat 32, the two left and right sides of the base 12 respectively include a first blocking piece 54 (a blocking plate is shown in FIG. 2; however, the present invention is not limited to such type only) and a second blocking piece 56 (a blocking column is shown in FIG. 2; however, the present invention is not limited to such type only). The two left and right sides of the bottom surface of the first seat 32 include a U-shape ring respectively. The two U-shape rings form a first blocking portion 38 and a second blocking portion 40 respectively (as shown in FIG. 5). When the movable platform 30 moves forward to allow the first blocking portion 38 to contact with the first blocking piece 54 (as shown in FIG. 11), the movable platform 30 is positioned at the first position P1.

Figure 12:
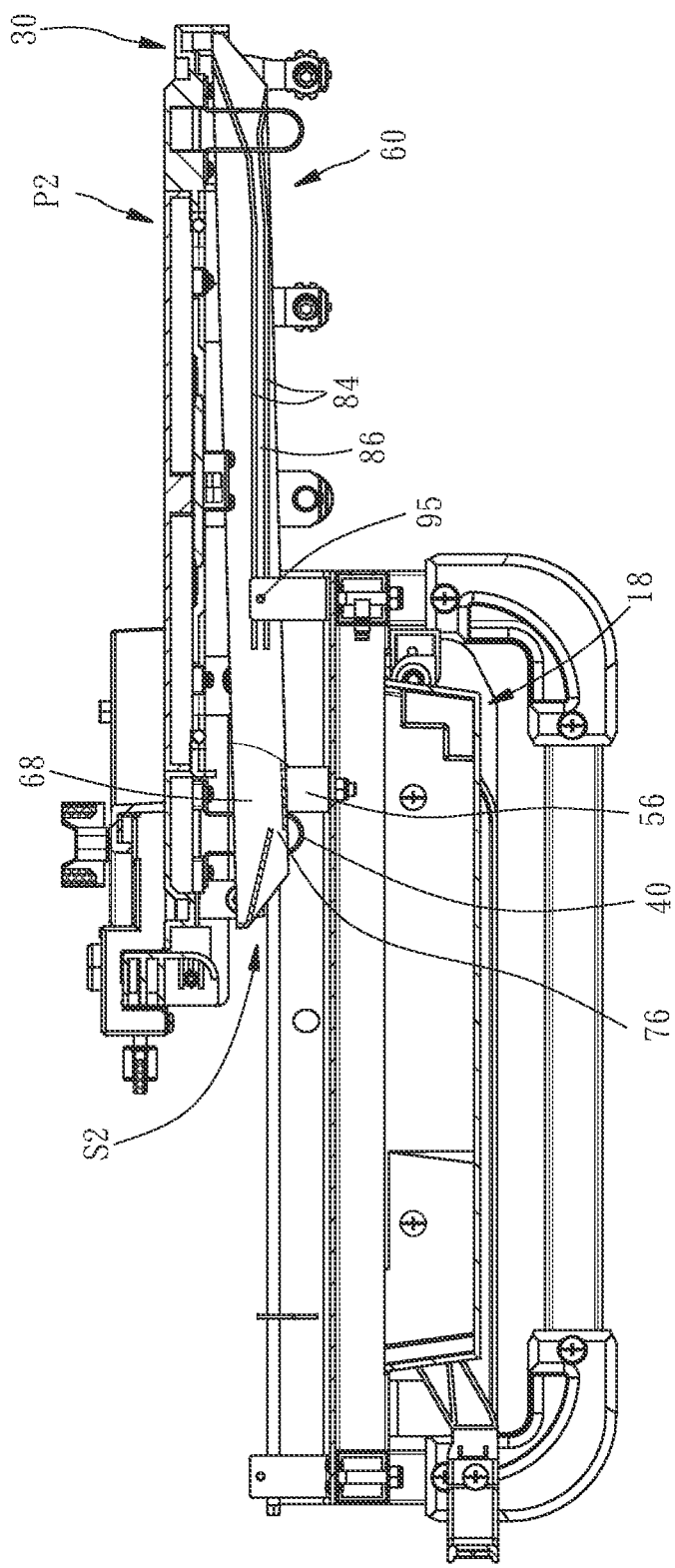
FIG. 12 is a partial cross sectional view of the worktable for a tile cutter, from a second side, with a water drainage assembly of the present invention, mainly showing the movable platform at the second position and the guiding member in the second state.

When the movable platform 30 moves rearward to allow the second blocking portion 40 to contact with the second blocking piece 56 (as shown in FIG. 12), the movable platform 30 is positioned at the second position P2.

Figure 4:
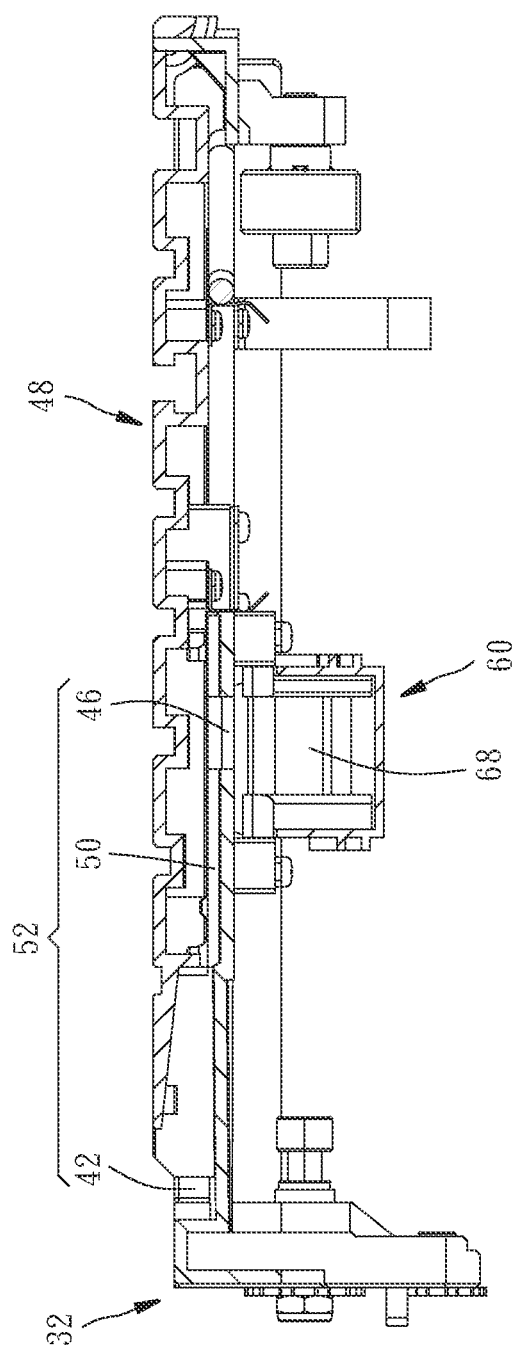
FIG. 4 is a cross sectional view of FIG. 2 taken along the cross sectional line 4-4.

In addition, as shown in FIG. 3, the top surface of the first seat 32 includes a first channel 42 formed along the edge thereof. The middle position of the first seat 32 includes a hollow slot 44 and a drainage opening 46 formed adjacent to the hollow slot 44. The movable platform 30 further includes a second seat 48. The second seat 48 is arranged on the top surface of the first seat 32 and covers the hollow slot 44 and the drainage opening 46. The second seat 48 forms a second channel 50 (as shown in FIG. 4) with the first seat 32. In addition, one end of the second channel 50 is communicated with the first channel 42, and another end of the second channel 50 is communicated with the drainage opening 46, thereby allowing the first channel 42, the second channel 50 and the drainage opening 46 to jointly form a drainage channel 52. Furthermore, the top surface of the second seat 48 is aligned with the top surface of the first seat 32, such that the tile placed on the top can be maintained to have excellent flatness.

Figure 6:
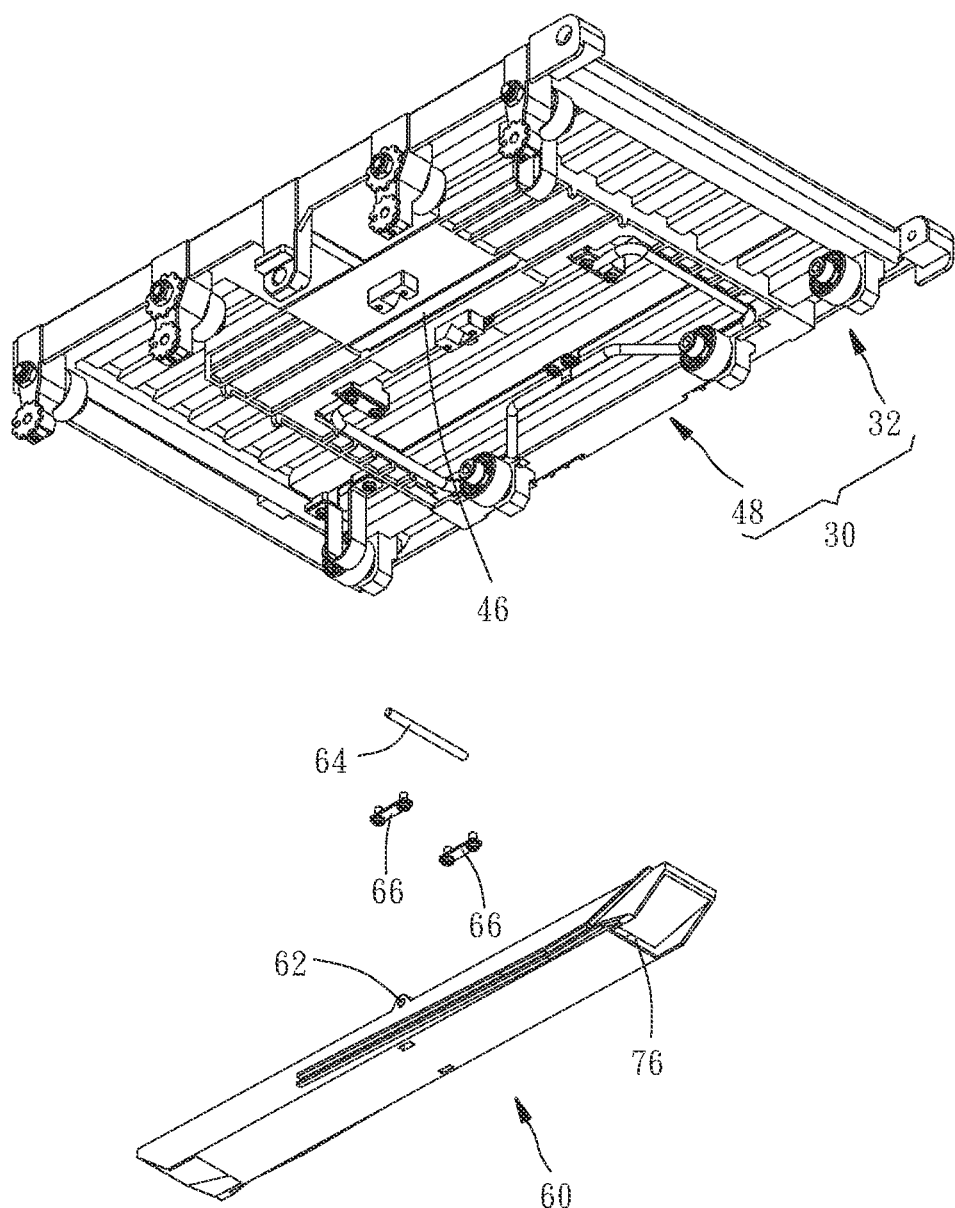
FIG. 6 is a partial perspective view of the worktable for a tile cutter with a water drainage assembly of the present invention.
Figure 7:
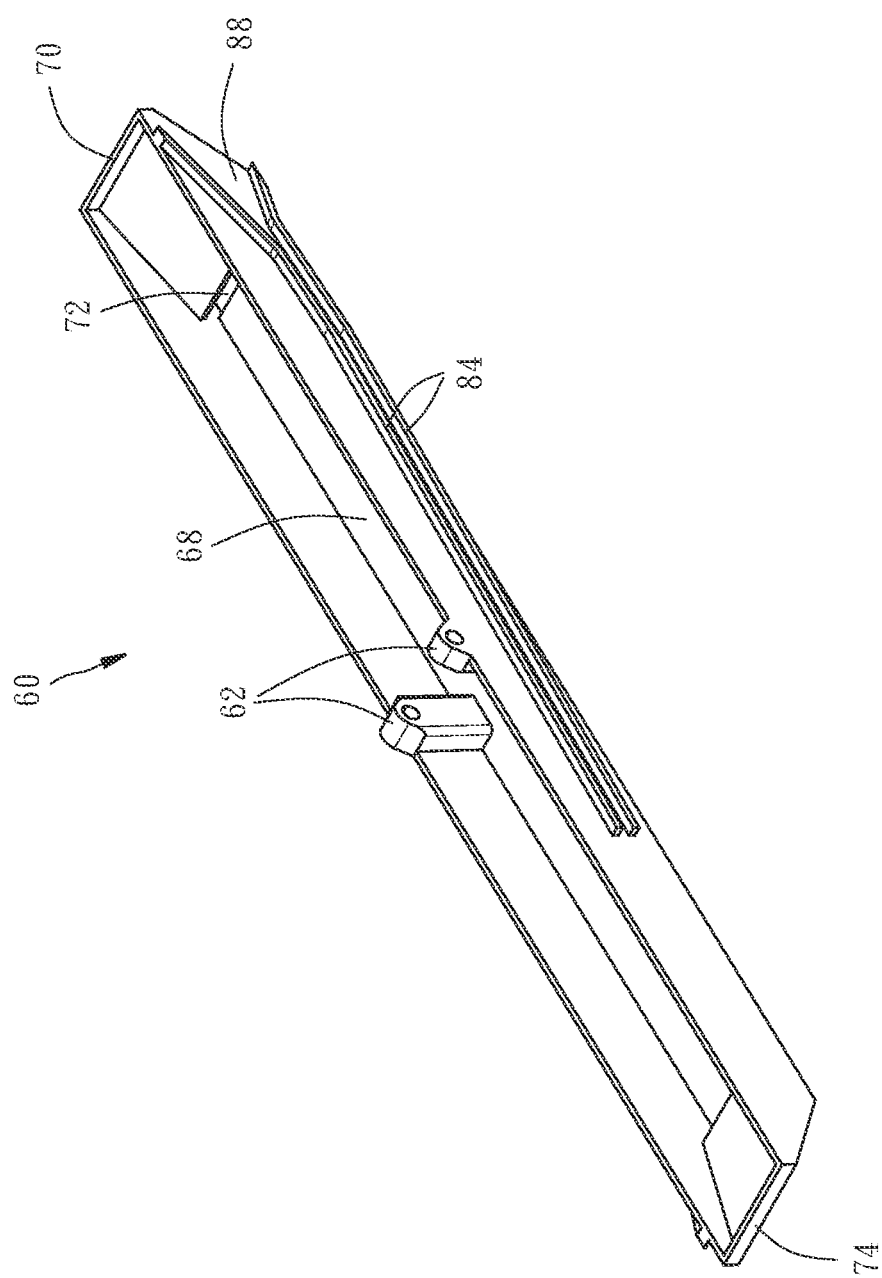
FIG. 7 is a perspective view of the worktable for a tile cutter with a water drainage assembly of the present invention, mainly showing the second protruding strip and the first diversion opening.
Figure 9:
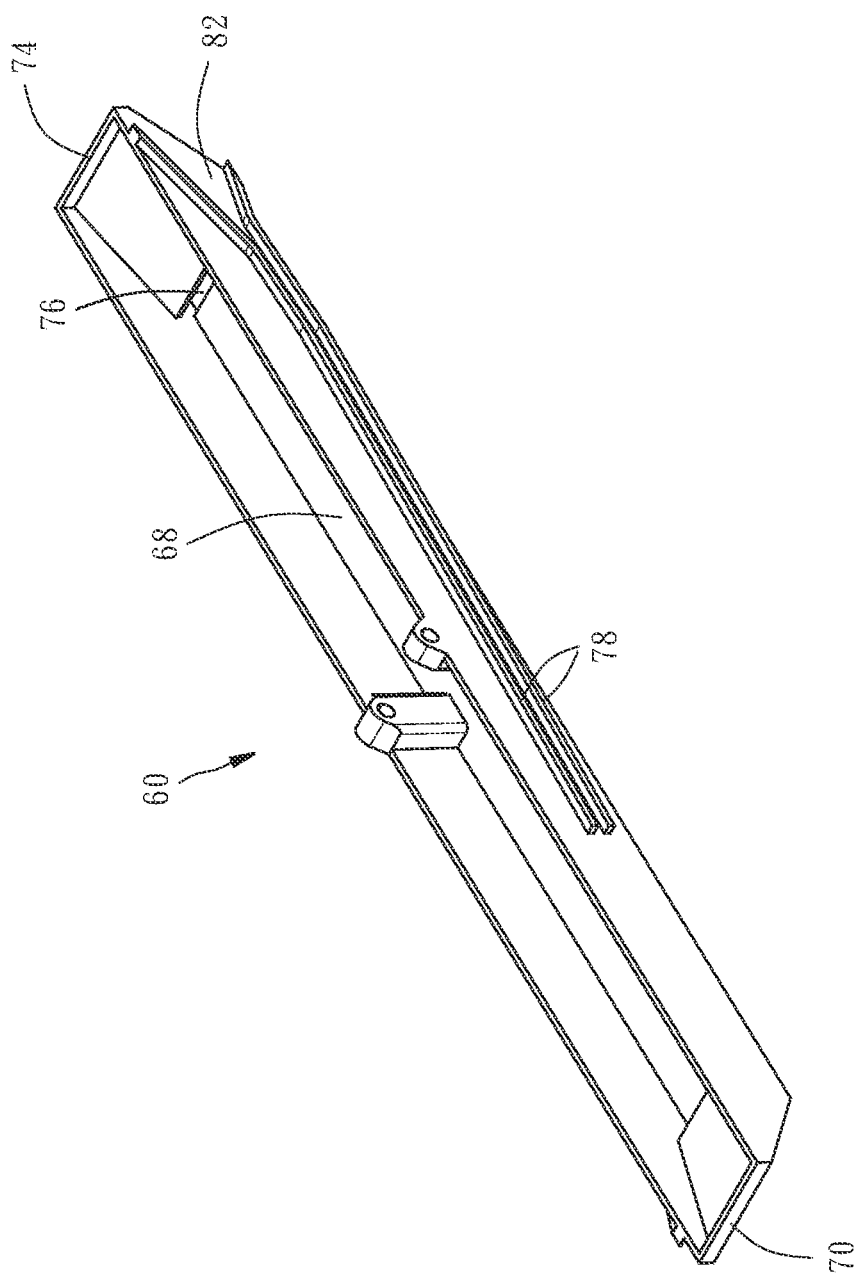
FIG. 9 is a perspective view of the worktable for a tile cutter with a water drainage assembly of the present invention from another viewing angle, mainly showing the first inclined slot and the second diversion opening.

As shown in FIG. 6, the center of the guiding member 60 includes two lugs 62, and a pivotal axle 64 penetrates through the two lugs 62 of the guiding member 60. The pivotal axle 64 is secured on the bottom surface of the first seat 32 by two securement plates 66, such that the guiding member 60 is able to use the pivotal axle 64 as an axle center to generate upward and downward swings similar to that of a seesaw. As shown in FIG. 7 and FIG. 9, the guiding member 60 includes a diversion channel 68. The diversion channel 68 is communicated with the drainage opening 46 of the first seat 32. The two opposite ends of the guiding member 60 include a first end 70 and a second end 74 respectively. The first end 70 of the guiding member 60 includes a first diversion opening 72 (as shown in FIG. 7) communicated with the diversion channel 68, and the second end 74 of the guiding member 60 includes a second diversion opening 76 (as shown in FIG. 9) communicated with the diversion channel 68.

Figure 8:
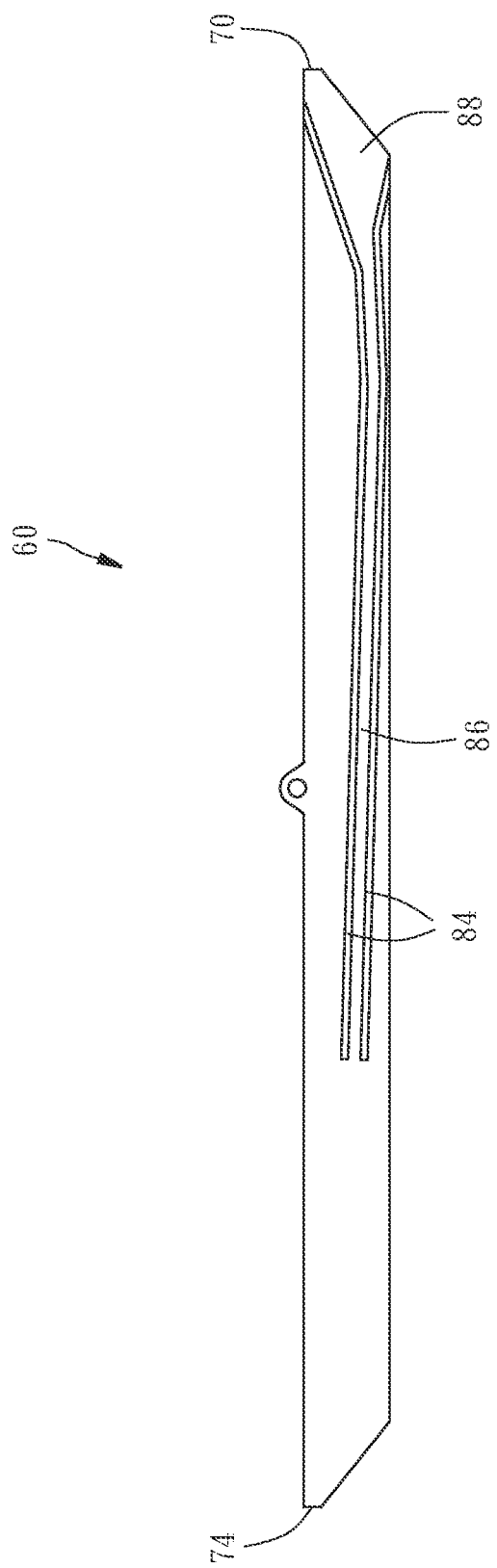
FIG. 8 is a side view of the worktable for a tile cutter with a water drainage assembly of the present invention, mainly showing the extension state of the second inclined slot.
Figure 10:
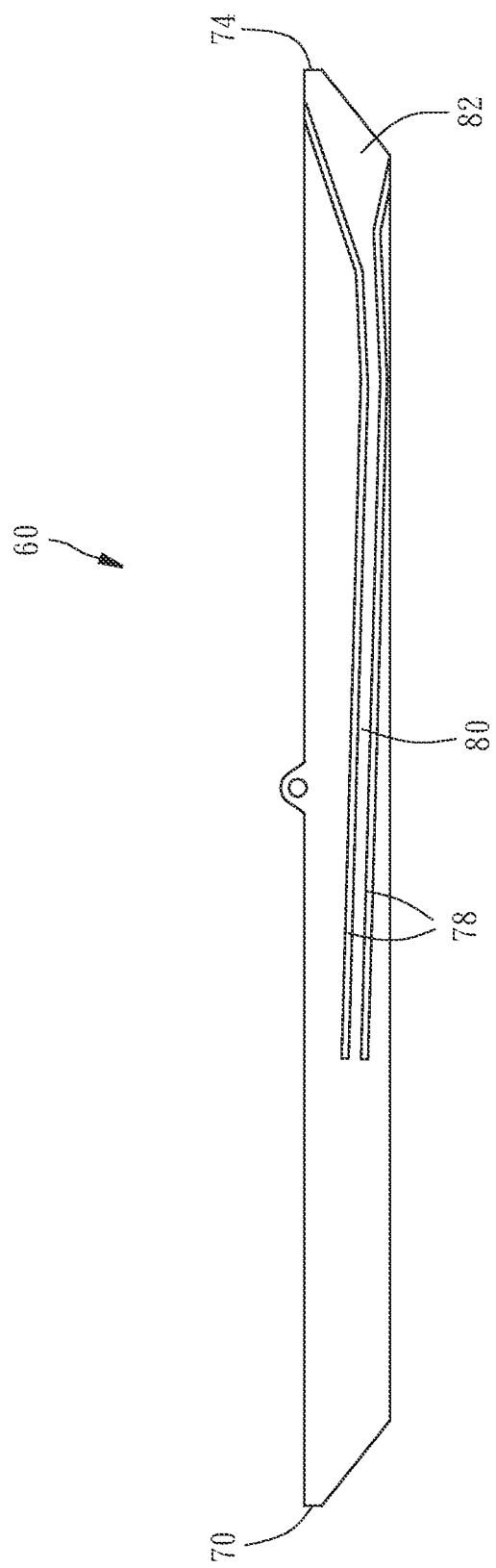
FIG. 10 is another side view of the worktable for a tile cutter with a water drainage assembly of the present invention, mainly showing the extension state of the first inclined slot.

In addition, as shown in FIG. 10, one side surface of the guiding member 60 includes two first protruding strips 78, and a first inclined slot 80 is formed between the two first protruding strips 78. The first inclined slot 80 extends from the second end 74 of the guiding member 60 toward the first end 70 of the guiding member 60 and inclined upward. Furthermore, as shown in FIG. 8, another opposite side surface of the guiding member 60 includes two second protruding strips 84, and a second inclined slot 86 is formed between the two second protruding strips 84. The second inclined slot 86 extends from the first end 70 of the guiding member 60 toward the second end 74 of the guiding member 60 and inclined upward.

Please refer to FIG. 2 again. The first guiding piece 90 and the second guiding piece 93 are arranged at the front and rear of the base 12 one after another and are located at the two left and right sides of the guiding member 60. The first guiding piece 90 includes a first support plate 91 and a first insertion pin 92. A bottom end of the first support plate 91 is secured to the front side of the base 12. The first insertion pin 92 is inserted at a top end of the first support plate 91. The second guiding piece 93 includes a second support plate 94 and a second insertion pin 95. A bottom end of the second support plate 94 is secured to the rear side of the base 12. The second insertion pin 95 is inserted at a top end of the second support plate 94.

During operation, the movable platform 30 is pulled from the initial position of being along side the securement platform 14 to the first position P1 as shown in FIG. 11, and the first guiding piece 90 uses the first insertion pin 92 for inserting into the first inclined slot 80. Since the first inclined slot 80 extends from the second end 74 of the guiding member 60 toward the first end 70 of the guiding member 60 and inclined upward, the first insertion pin 92 pushes the two first protruding strips 78, in order to allow the guiding member 60 to pivotally rotate to the first state S1 with the pivotal axle 64 as the axle center, as shown in FIG. 11. At this time, the first diversion opening 72 is located on top of the water collection tank 18, and a vertical distance between the first diversion opening 72 and the movable platform 30 is greater than a vertical distance between the second diversion opening 76 and the movable platform 30. In other words, the diversion channel 68 is in a state of being inclined downward and toward the first diversion opening 72, thereby allowing the diversion channel 68 to guide the water flowing from the drainage channel 52 into the water collection tank 18 via the first diversion opening 72.

During the process when the movable platform 30 is pushed to the second position P2 as shown in FIG. 12, the first insertion pin 92 disengages from the first inclined slot 80, and the second guiding piece 93 uses the second insertion pin 95 for inserting into the second inclined slot 86. Since the second inclined slot 86 extends from the first end 70 of the guiding member 60 toward the second end 74 of the guiding member 60 and inclined upward, the second insertion pin 95 pushes the two second protruding strips 84, in order to allow the guiding member 60 to pivotally rotate to the second state S2 with the pivotal axle 64 as the axle center, as shown in FIG. 12. At this time, the second diversion opening 76 is located on top of the water collection tank 18, and a vertical distance between the second diversion opening 76 and the movable platform 30 is greater than a vertical distance between the first diversion opening 72 and the movable platform 30. In other words, the diversion channel 68 is in a state of being inclined downward and toward the second diversion opening 76, thereby allowing the diversion channel 68 to guide the water flowing from the drainage channel 52 into the water collection tank 18 via the second diversion opening 76. That is, regardless of whether the movable platform 30 moves forward or rearward, as the guiding member 60 swings upward and downward, the guiding member 60 is able to properly guide the water from the drainage channel 52 into the water collection tank 18, in order to overcome the water accumulation problem of the movable platform 30, thereby preventing the situation where the movable platform 30 and operator are wetted and contaminated due to water accumulation.

It shall be noted that, as shown in FIG. 10, the two first protruding strips 78 form a first conical opening 82 communicated with the first inclined slot 80 at the second end 74 of the guiding member 60. The width of the first conical opening 82 increases along a direction away from the first inclined slot 80. Accordingly, it is able to allow the first insertion pin 92 to engage with or disengage from the first inclined slot 80 successfully, thereby preventing interference with the two first protruding strips 78. Similarly, as shown in FIG. 8, the two second protruding strips 84 form a second conical opening 88 communicated with the second inclined slot 86 at the first end 70 of the guiding member 60. The width of the second conical opening 88 increases along a direction away from the second inclined slot 86. Accordingly, it is able to allow the second insertion pin 95 to engage with or disengage from the second inclined slot 86 successfully, thereby preventing interference with the two second protruding strips 84.

What is claimed is:

1. A worktable with a water drainage assembly, comprising a tile cutter including a base and a water collection tank arranged on the base, further comprising:
    a movable platform located on top of the water collection tank and movably arranged on the base to move between a first position and a second position, and the movable platform having a drainage channel penetrating through a top surface and a bottom surface thereof; and
    a guiding member pivotally attached to the bottom surface of the movable platform and configured to swing upward and downward between a first state and a second state relative to the movable platform, such that the guiding member is in the first state when the movable platform is at the first position, and the guiding member is in the second state when the movable platform is at the second position, wherein:
    the guiding member has a diversion channel communicated with the drainage channel; and
    a first end of the guiding member having a first diversion opening communicated with the diversion channel, and a second end of the guiding member having a second diversion opening communicated with the diversion channel, such that the first diversion opening is located on top of the water collection tank and a vertical distance between the first diversion opening and the movable platform is greater than a vertical distance between the second diversion opening and the movable platform when the guiding member is in the first state, and the second diversion opening is located on top of the water collection tank and a vertical distance between the second diversion opening and the movable platform is greater than a vertical distance between the first diversion opening and the movable platform when the guiding member is in the second state;
    a first guiding piece and a second guiding piece, wherein:
    the first guiding piece and the second guiding piece are respectively secured to a front side and a rear side of the base one after another and respectively located at a left side and an opposite right side of the guiding member;
    a side surface of the guiding member having a first inclined slot, the first inclined slot extending from the second end of the guiding member toward the first end of the guiding member and inclined upward;
    another opposite side surface of the guiding member having a second inclined slot, the second inclined slot extending from the first end of the guiding member toward the second end of the guiding member and inclined upward,
    such that the guiding member is in the first state when the first guiding member is inserted into the first inclined slot, and the guiding member is in the second state when the second guiding member is inserted into the second inclined slot;
    wherein the second end of the guiding member includes a first conical opening communicated with the first inclined slot, a width of the first conical opening increases along a direction away from the first inclined slot; and
    the first end of the guiding member includes a second conical opening communicated with the second inclined slot, a width of the second conical opening increases along a direction away from the second inclined slot.

2. The worktable for a tile cutter with a water drainage assembly according to claim 1, wherein:
    the first guiding piece includes a first support plate and a first insertion pin;
    a bottom end of the first support plate is secured to the base, the first insertion pin is arranged at a top end of the first support plate, the first guiding piece uses the first insertion pin for inserting into the first inclined slot; and
    the second guiding piece includes a second support plate and a second insertion pin; a bottom end of the second support plate is secured to the base, the second insertion pin is arranged at a top end of the second support plate, the second guiding piece uses the second insertion pin for inserting into the second inclined slot.

3. The worktable for a tile cutter with a water drainage assembly according to claim 1, wherein:
    the movable platform includes a first seat and a second seat; the first seat is movably arranged on the base, a top surface of the first seat includes a first channel, and the first seat includes a drainage opening communicated with the diversion channel; and
    the second seat is detachably arranged on the top surface of the first seat and includes a second channel formed with the first seat, one end of the second channel communicated with the first channel, and another end of the second channel communicated with the drainage opening, such that the first channel, the second channel and the drainage opening jointly form the drainage channel.

4. The worktable for a tile cutter with a water drainage assembly according to claim 1, further comprising:
    a first blocking piece and a second blocking piece, the first blocking piece and the second blocking piece secured to two left and right sides of the base; wherein:
    the bottom surface of the movable platform has a blocking portion and a second blocking portion, such that the movable platform is positioned at the first position when the first blocking portion of the movable platform contacts with the first blocking piece, and the movable platform is positioned at the second position when the second blocking portion of the movable platform contacts with the second blocking piece.

5. A worktable with a water drainage assembly, comprising a tile cutter including a base and a water collection tank arranged on the base, further comprising:
    a movable platform located on top of the water collection tank and movably arranged on the base to move between a first position and a second position, and the movable platform having a drainage channel penetrating through a top surface and a bottom surface thereof; and
    a guiding member pivotally attached to the bottom surface of the movable platform and configured to swing upward and downward between a first state and a second state relative to the movable platform, such that the guiding member is in the first state when the movable platform is at the first position, and the guiding member is in the second state when the movable platform is at the second position, wherein
    the guiding member has a diversion channel communicated with the drainage channel;
    a first end of the guiding member having a first diversion opening communicated with the diversion channel, and a second end of the guiding member having a second diversion opening communicated with the diversion channel, such that the first diversion opening is located on top of the water collection tank and a vertical distance between the first diversion opening and the movable platform is greater than a vertical distance between the second diversion opening and the movable platform when the guiding member is in the first state, and the second diversion opening is located on top of the water collection tank and a vertical distance between the second diversion opening and the movable platform is greater than a vertical distance between the first diversion opening and the movable platform when the guiding member is in the second state;

a first guiding piece and a second guiding piece, wherein:

the first guiding piece and the second guiding piece are respectively secured to a front side and a rear side of the base one after another and respectively located at a left side and an opposite right side of the guiding member;

a side surface of the guiding member having a first inclined slot, the first inclined slot extending from the second end of the guiding member toward the first end of the guiding member and inclined upward; and another opposite side surface of the guiding member having a second inclined slot, the second inclined slot extending from the first end of the guiding member toward the second end of the guiding member and inclined upward, such that the guiding member is in the first state when the first guiding member is inserted into the first inclined slot, and the guiding member is in the second state when the second guiding member is inserted into the second inclined slot.

* * * * *